United States Patent
Shanmugam

(10) Patent No.: US 11,106,492 B2
(45) Date of Patent: Aug. 31, 2021

(54) WORKFLOW SERVICE FOR A CLOUD FOUNDRY PLATFORM

(71) Applicant: EMC IP Holding Company LLC, Hopkinton, MA (US)

(72) Inventor: Karunanithi Shanmugam, Frisco, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 15/965,015

(22) Filed: Apr. 27, 2018

(65) Prior Publication Data

US 2019/0332423 A1     Oct. 31, 2019

(51) Int. Cl.
*G06F 9/48* (2006.01)
*H04L 29/08* (2006.01)

(52) U.S. Cl.
CPC ............ *G06F 9/4881* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,055,935 B2* | 11/2011 | Chafle | ................... | G06Q 10/06 714/4.21 |
| 8,812,752 B1* | 8/2014 | Shih | ........................ | G06F 9/542 710/29 |
| 9,710,307 B1* | 7/2017 | Corley | ................... | G06F 9/4843 |
| 10,102,012 B2* | 10/2018 | Harrison | ............. | G06F 9/44505 |
| 10,187,323 B2* | 1/2019 | Laplanche | .......... | G06F 9/45558 |
| 10,255,409 B2* | 4/2019 | Kisiel | ....................... | G16B 5/00 |
| 10,733,013 B2* | 8/2020 | Sinha | ........................ | G06F 8/24 |
| 2005/0228711 A1* | 10/2005 | Lahey | .................... | G06Q 10/06 705/7.26 |
| 2011/0083138 A1* | 4/2011 | Sivasubramanian | ........................ | G06F 16/217 719/328 |

(Continued)

OTHER PUBLICATIONS

Suresh Marru et al. "Apache Airavata: A framework for Distributed Applications and Computational Workflows" Copyright 2011 ACM 978-1-4503-1123—Jun. 11, 11 (Marru_2011.pdf; pp. 21-28) (Year: 2011).*

(Continued)

*Primary Examiner* — Hiren P Patel
(74) *Attorney, Agent, or Firm* — Ryan, Mason & Lewis, LLP

(57) ABSTRACT

A workflow service is provided on a cloud-based platform, such as a cloud foundry platform. An exemplary method comprises: providing a workflow service in a cloud-based platform, wherein the workflow service comprises a workflow executor service; obtaining, by the workflow service, a workflow configuration file specifying a sequence of tasks for execution by the workflow service; processing the workflow configuration file using the workflow executor service to create a workflow instance; initiating a given task from the workflow instance for execution by a task executor that publishes a status and/or any outputs of the given task as an event to an event source; monitoring the event source, using an event listener, to obtain the status and/or the outputs of the given task; and identifying a next task in the sequence based on the status of the given task.

20 Claims, 6 Drawing Sheets

(56) References Cited

U.S. PATENT DOCUMENTS

| | | | |
|---|---|---|---|
| 2011/0099420 A1* | 4/2011 | MacDonald McAlister | G06F 11/2025 714/6.32 |
| 2013/0212234 A1* | 8/2013 | Bartlett | G06Q 10/0633 709/220 |
| 2013/0247050 A1* | 9/2013 | Watanabe | G06F 11/3433 718/101 |
| 2013/0268258 A1* | 10/2013 | Patrudu | G06F 17/28 704/2 |
| 2014/0047028 A1* | 2/2014 | Buth | G06Q 10/103 709/204 |
| 2014/0297354 A1* | 10/2014 | Kogiso | G06F 9/48 705/7.26 |
| 2015/0067687 A1* | 3/2015 | Turner | G06F 9/4881 718/102 |
| 2015/0070719 A1* | 3/2015 | Kuribara | G06F 3/1238 358/1.13 |
| 2015/0089274 A1* | 3/2015 | Mares | H04L 51/04 714/4.11 |
| 2015/0135185 A1* | 5/2015 | Sirota | G06F 9/5011 718/103 |
| 2015/0170088 A1* | 6/2015 | Rizk | G06F 8/34 705/7.26 |
| 2016/0014198 A1* | 1/2016 | Kitano | G06F 11/16 709/226 |
| 2016/0154684 A1* | 6/2016 | Kusu | G06F 9/52 718/107 |
| 2016/0188789 A1* | 6/2016 | Kisiel | G16B 5/00 |
| 2017/0039492 A1* | 2/2017 | Henke | G06Q 10/0633 |
| 2017/0220324 A1* | 8/2017 | Balasubramanian | G06F 8/20 |
| 2017/0317932 A1* | 11/2017 | Paramasivam | H04L 47/125 |
| 2018/0089591 A1* | 3/2018 | Zeiler | G06F 8/00 |
| 2018/0107461 A1* | 4/2018 | Balasubramanian | G06F 8/35 |
| 2018/0165070 A1* | 6/2018 | Kham Bay | G06F 9/541 |
| 2018/0316772 A1* | 11/2018 | Eberlein | H04L 67/2809 |
| 2019/0207828 A1* | 7/2019 | Bon | G06F 9/5072 |

OTHER PUBLICATIONS

"Amazon Simple Workflow Service (SWF)", Cloud Workflow Development—AWS, downloaded from https://aws.amazon.com/swf/ on Apr. 11, 2018.

"Amazon SWF FAQs", AWS Amazon Simple Workflow (SWF), downloaded from https://aws.amazon.com/swf/faqs/ on Apr. 11, 2018.

"Amazon SWF Product Details—Amazon SWF Functionality", downloaded from https://aws/a,azpm/cp,/swf/details/ on Apr. 11, 2018.

"Service Integration Overview", Pivotal Docs, downloaded from https://docs.pivotal.ion/tiledev/2-0/overview.html on Apr. 10, 2018.

* cited by examiner

WORKFLOW SERVICE FOR A CLOUD FOUNDRY PLATFORM

FIELD

The field relates generally to information processing systems.

BACKGROUND

Workflow services coordinate an execution of a specified workflow and maintain an execution state of the workflow. A workflow service can automate workflows that include human tasks that have an indefinite duration (such as approvals, reviews and investigations). Existing workflow services, such as Amazon Simple Workflow Service (SWF), typically employ proprietary, vendor-specific technologies.

A need exists for a workflow service that can be employed on a cloud-based platform, such as cloud foundry platform.

SUMMARY

Illustrative embodiments of the present disclosure provide a workflow service on cloud-based platform, such as a cloud foundry platform. In one embodiment, an exemplary method comprises: providing a workflow service in a cloud-based platform, wherein the workflow service comprises a workflow executor service; obtaining, by the workflow service, a workflow configuration file specifying a sequence of tasks for execution by the workflow service; processing the workflow configuration file using the workflow executor service to create a workflow instance corresponding to the workflow configuration file; initiating a given task from the workflow instance for execution by a task executor, wherein the task executor publishes one or more of a status and one or more outputs of the given task as an event to an event source; monitoring the event source, using an event listener, to obtain the one or more of the status and the one or more outputs of the given task; and identifying a next task in the sequence of tasks based on the status of the given task. In one or more embodiments, a service broker is created that wraps the workflow service as a tile in the cloud-based platform.

In some embodiments, the workflow executor service, the task executor, the event source and/or the event listener are implemented using open source technology that allow the workflow executor service, the task executor, the event source and/or the event listener components to be one or more of configurable and vendor neutral. The workflow configuration file optionally specifies the sequence of tasks using a Java Simple Object Notation.

Other illustrative embodiments include, without limitation, apparatus, systems, methods and computer program products comprising processor-readable storage media.

DETAILED DESCRIPTION

Figure 1:
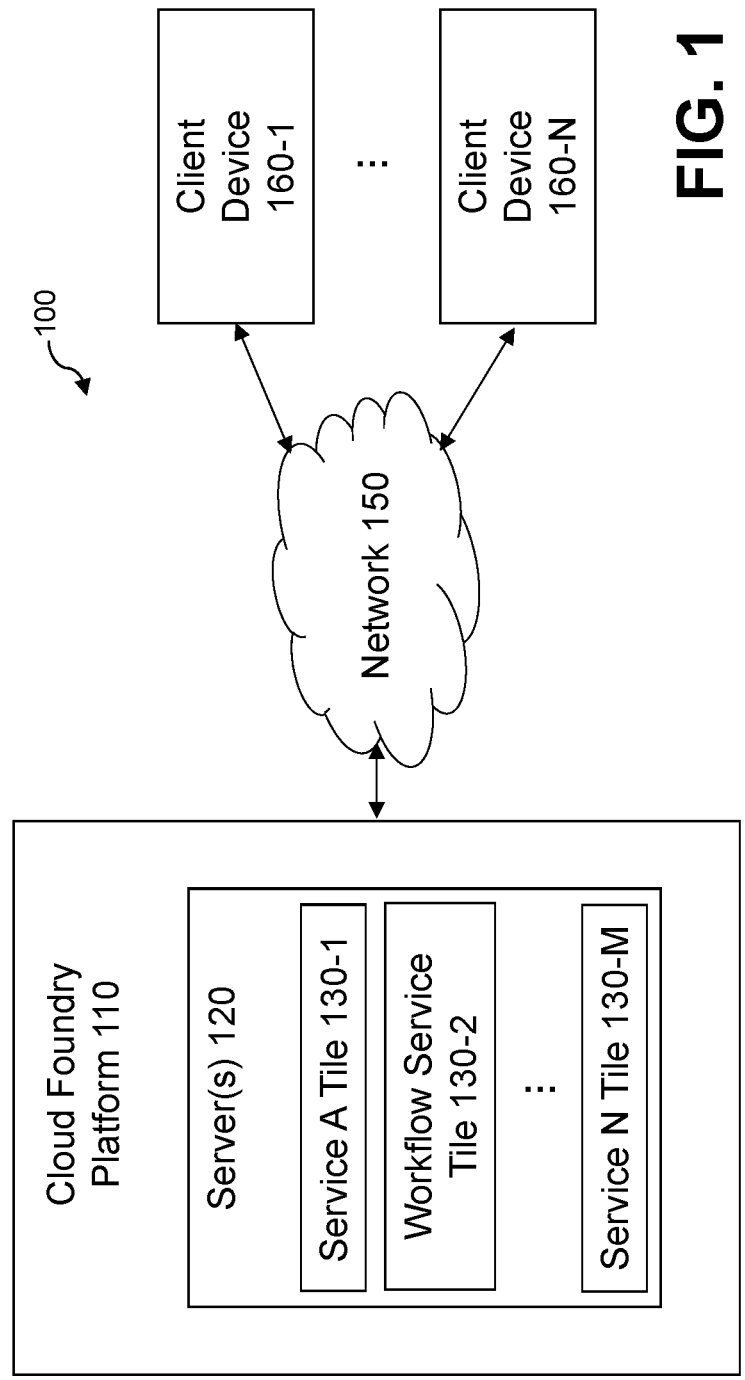
FIG. 1 illustrates an information processing system configured in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for providing a workflow service on a cloud-based platform, such as cloud foundry platform.

In some embodiments, a workflow service is provided for a cloud-based platform, such as a Pivotal Cloud Foundry (PCF) platform from Pivotal Software, Inc. The disclosed workflow service comprises a workflow executor service. A workflow configuration file is obtained from a user specifying a sequence of tasks for execution by the workflow service. The workflow configuration file can be specified, for example, using a Java Simple Object Notation (JSON). The workflow configuration file is processed using the workflow executor service to create a workflow instance corresponding to the workflow configuration file. A given task from the workflow instance is instantiated for execution by a task executor that publishes a status and/or any outputs of the given task as an event to an event source. The event source is monitored, using an event listener, to obtain the status and/or the outputs of the given task. A next task, if any, is identified in the sequence of tasks based on the status of the given task.

In one or more embodiments, one or more components of the disclosed workflow service are implemented using one or more open source technologies that allow the components to be configurable and/or vendor neutral.

In at least one embodiment, the disclosed workflow service can be wrapped with a service broker in the cloud foundry. The wrapped workflow service can be created in some embodiments as a tile, as discussed further below in conjunction with FIG. 1. Thus, in some embodiments, a service broker comprises the disclosed workflow service. Generally, services can be integrated with a cloud foundry, such as PCF, by implementing a documented Application Programming Interface (API) for which a cloud controller is the client; referred to in PCF as the service broker API. "Service broker" refers to a component of the service that implements the service broker API. Service brokers advertise a catalog of service offerings and service plans, as well as interpreting calls for provision (create), bind, unbind, and deprovision (delete), in a known manner.

Service brokers allow developers to create service instances in their development spaces that the developers can call from their code. The service brokers provide an interface between a cloud controller and the add-on software service that they represent. The service can run internal or external to a cloud foundry deployment, but the service broker runs inside the cloud.

The service broker works by providing an API which the cloud controller calls to create service instances, bind them to applications, and perform other operations. Cloud foundry service brokers are implemented as HTTP servers that conform to the service broker API.

While one or more embodiments of the disclosure are described with respect to a cloud foundry platform, the disclosure is applicable to any cloud-based platform, such as the PCF platform, as would be apparent to a person of ordinary skill in the art.

FIG. 1 illustrates an information processing system 100 configured in accordance with an illustrative embodiment. The information processing system 100 is assumed to be built on at least one processing platform and provides functionality for providing a workflow service on a cloud-based platform, such as the cloud foundry platform. In the embodiment of FIG. 1, the system 100 more particularly comprises a cloud foundry platform 110, and a plurality of client devices 160-1 through 160-N (collectively, client devices 160) coupled to a network 150.

The exemplary cloud foundry platform 110 may be implemented on a single server, or alternatively, on multiple servers, that may be physical, virtual, or a combination thereof. In one embodiment of the disclosure, the cloud foundry platform 110 may be implemented on one or more computing systems similar to the exemplary computing systems shown in FIGS. 5 and 6.

In one embodiment of the disclosure, the cloud foundry platform 110 may be a hardware and/or software implemented environment for the deployment of services and resources. The cloud foundry platform 110 may be implemented on one or more servers 120. Each server 120 may be a physical server or a virtual server that may be cloud-based. In some embodiments, each server 120 may be a computing system similar to the exemplary computing systems discussed further below in conjunction with FIGS. 5 and 6. Further, each server 120 may be any computing system that may be programmed to receive requests, process requests, and based on the processing of requests, extend services and/or resources to client devices 160. Exemplary types of servers include, but are not limited to, virtualized servers, database servers and application servers.

As shown in FIG. 1, the one or more servers 120 of the cloud foundry platform 110 comprise a plurality of service tiles 130-1 through 130-M, including an exemplary workflow service tile 130-2 according to some embodiments. Generally, a cloud foundry platform 110 offers a directory of services, from which users can provision reserved resources, in a known manner. These resources are known as service instances and the systems that deliver and operate these resources are known as Services.

Services optionally integrate with a cloud foundry, such as PCF, through tiles that users download from the Pivotal Network and install using the PCF Ops Manager Installation Dashboard. Generally, tiles provide a modular, standard interface that PCF operators use to configure, publish, manage and upgrade software services, in a known manner. For example, a service broker can wrap the disclosed workflow service as the workflow service tile 130-2 in the cloud foundry platform 110.

For a more detailed discussion of tile development and tile deployment in a cloud foundry, see, for example, Pivotal Documentation, PCF Tile Developers Guide, Version 1.12, "Service Integration Overview," incorporated by reference herein in its entirety.

The exemplary workflow service tile 130-2 exposes a workflow service, as discussed further below in conjunction with FIG. 2, that can (i) coordinate execution of a workflow specified, for example, using a workflow configuration file, as discussed further below in conjunction with FIG. 3, and (ii) maintain an execution state of the workflow (for example, the steps that have completed, and the steps that are running). Among other benefits, the workflow service exposed by the exemplary workflow service tile 130-2 can automate workflows that include human tasks that have an indefinite duration (such as approvals, reviews and investigations).

The client devices 160 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 160 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 150 is assumed to comprise a global computer network such as the Internet, although other types of networks can be part of the network 150, including a wide area network (WAN), a local area network (LAN), a satellite network, a telephone or cable network, a cellular network, a wireless network such as a WiFi or WiMAX network, or various portions or combinations of these and other types of networks.

While aspects of the illustrative embodiments are described using PCF, other types of cloud foundries can be employed, such as open source cloud foundries and the Dell Boomi™ integration cloud provider from Dell EMC of Hopkinton, Mass.

Figure 2:
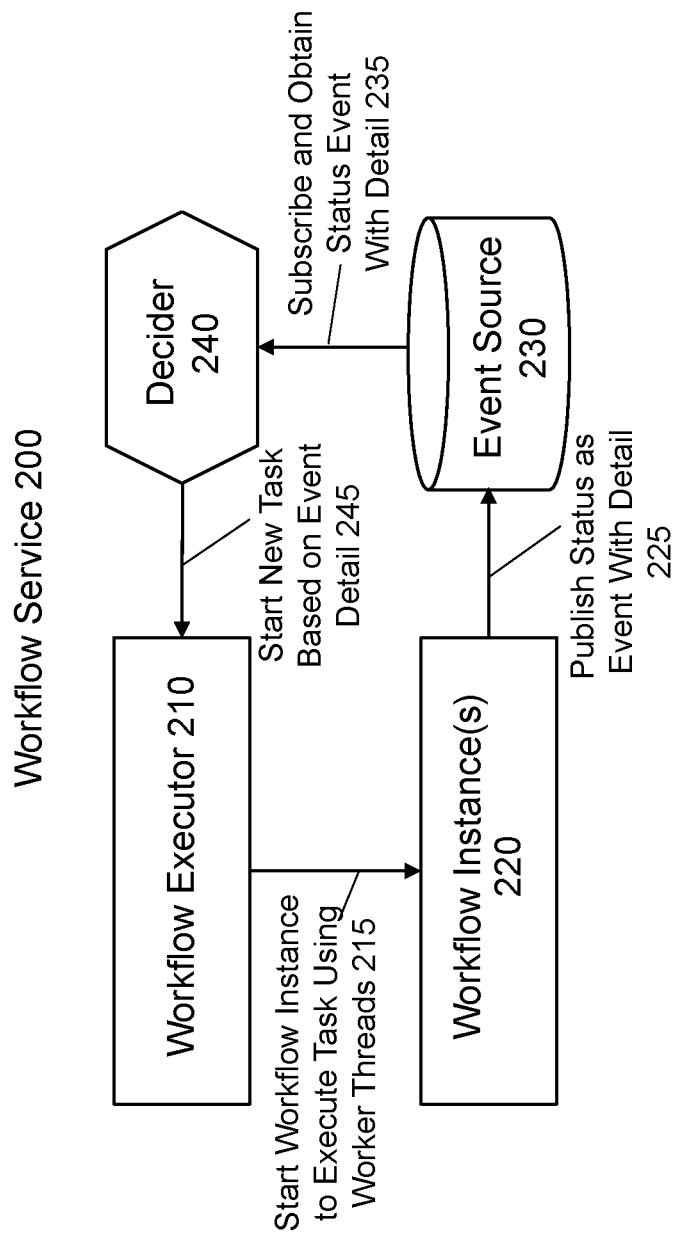
FIGS. 2 and 3 illustrate exemplary implementations of a workflow service, according to some embodiments.

FIG. 2 illustrates an exemplary workflow service 200, according to some embodiments. As noted above, the exemplary workflow service 200 can optionally be exposed by the exemplary workflow service tile 130-2 of FIG. 1. The exemplary workflow service 200 comprises a workflow executor 210, one or more workflow instances 220, an event source 230 and a decider 240. Specific exemplary implementations of one or more of the components of the exemplary workflow service 200 are discussed further below in conjunction with FIG. 3.

Generally, the workflow executor 210 can be started as an independent process, to process a user-specified workflow configuration file, as discussed further below in conjunction with FIG. 3, and start a new workflow instance 220 to execute one or more tasks of the workflow during step 215. Workflow instances 220 are programs that interact with the workflow executor 210 to obtain tasks, process received tasks, and publish the results.

Each task will be executed by the new workflow instance 220 and the new workflow instance 220 publishes a status of the task along with corresponding detail (such as the task output) as an event on the event source 230 during step 225.

The event source 230 maintains the state of the workflow and its tasks. Thus, workflow instances 220 and the decider 240 do not have to keep track of execution state.

In some embodiments, the decider 240 controls a coordination of the tasks (e.g., their ordering, concurrency, and scheduling according to the application logic). Generally, the decider 240 is a software program that coordinates task execution across multiple workflow instances 220. The separation of processing steps by the workflow instances 220 and their coordination by the decider 240 allows an application to be managed in a controlled flexible manner. The decoupling of workflow instances 220 and the deciders 240 allows business logic to be dynamic and an application can be quickly updated to accommodate new requirements.

For example, tasks can be removed, bypassed, or re-executed and new application flows can be added or updated by changing the decider 240, in a known manner.

In at least one embodiment, the decider 240 is implemented as a message listener process that acts as a subscriber to the topic related the workflow instance 220 in the event source 230. Thus, the decider 240 subscribes to the topic and obtains the status event with the detail during step 235.

When a workflow status change has been published by the task of the workflow instance 220, the decider 240 receives the message and decides on the next task to be executed in the workflow instance. The decider 240 notifies the workflow executor 210 to start a new task based on event detail during step 245.

Once the workflow gets completed, the workflow instance 220 publishes the message to the respective topic in the event source 230. The decider 240 then updates the status of workflow instance 220 as completed and publishes the workflow status on the event source 230 for storage. In this manner, in some embodiments, the status of the workflow instance 220 can be monitored (e.g., at any point in time), using a monitoring agent that is subscribed to the topic. The event tracking of any work instance will be persisted in the event source store 230 and will be kept, for example, for a pre-configured time period.

In one or more embodiments, there can be interactions between any two workflow instances 220 if the types of the two workflow instances 220 are configured in the same domain.

Figure 3:
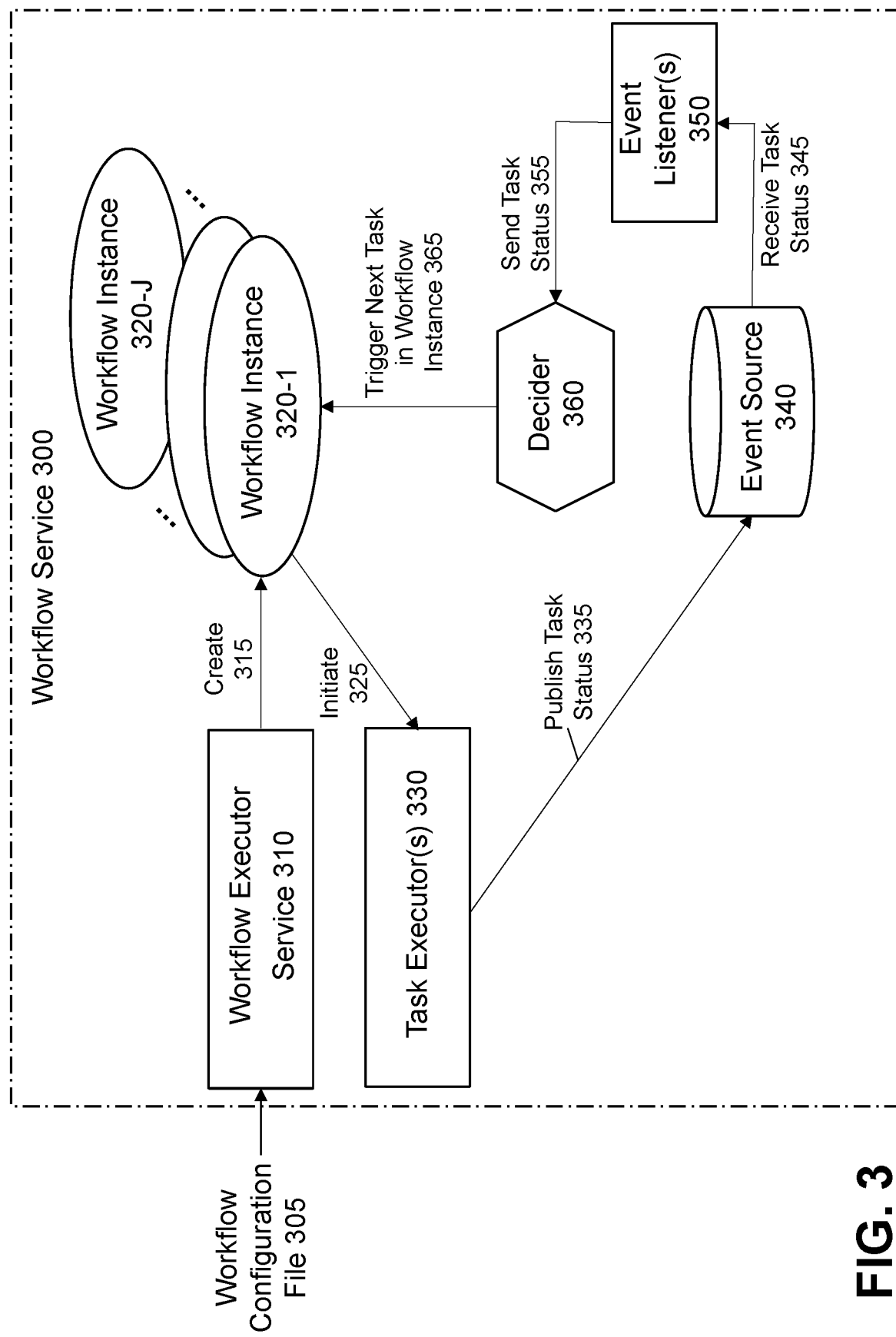

FIG. 3 illustrates an exemplary implementation of a workflow service 300, according to one or more embodiments. As noted above, the exemplary workflow service 300 can optionally be exposed in the cloud foundry by the exemplary workflow service tile 130-2 of FIG. 1. The exemplary workflow service 300 comprises a workflow executor 310, one or more workflow instances 320-1 through 320-J, an event source 340 and a decider 360, in a similar manner as FIG. 2. In addition, the exemplary workflow service 300 further comprises one or more task executors 330 and one or more event listeners 350, discussed below.

As noted above, the workflow executor 310 can be started as an independent process, to process a user-specified workflow configuration file 305, and create a new workflow instance 320-i of a plurality of workflow instances 320-1 through 320-J during step 315. In some embodiments, the workflow configuration file 305 is specified using a using JSON format. The workflow executor 310 can be implemented, for example, as a Spring Boot executor from Pivotal Software, Inc. Workflow instances 320 are programs that interact with the workflow executor 310 to obtain tasks of the workflow, process received tasks, and publish the results, as indicated above.

The new workflow instance 320-i initiates a task executor 330 during step 325 to execute one or more tasks of the workflow specified by the workflow configuration file 305. In this manner, each task will be executed by the task executor 330 and the task executor 330 publishes a status of the task during step 335, optionally along with corresponding detail (such as the task output) as an event to the event source 340. The task executor 330 can be implemented, for example, as a Scheduler for PCF from Pivotal Software, Inc. The event source 340 can be implemented, for example, as a Redis in-memory data structure store from Redis Labs with a RabbitMQ open source message broker.

The event source 340 maintains the state of the workflow and its tasks, as discussed above in conjunction with FIG. 2. Thus, workflow instances 320 and the decider 360 do not have to keep track of execution state.

When a workflow status change has been published to the event store 340, an event listener 350 receives a status change message during step 345 and sends the status change message to the decider 360 during step 355. In at least one embodiment, the event listener 350 is implemented as a message listener process that acts as a subscriber to the topic related to the workflow instance 320-1 in the event source 340. Thus, the event listener 350 subscribes to the topic and obtains the status event with the task detail.

In some embodiments, the task executors 330 and event listeners 350 employ the same open source technology as the event source 230, such as a RabbitMQ open source message broker.

The decider 360 decides on the next task to be executed in the workflow instance 320-i and triggers the next task in the workflow instance 320-i during step 365. In some embodiments, the decider 360 controls a coordination of the tasks (e.g., their ordering, concurrency, and scheduling according to the application logic), as discussed above in conjunction with FIG. 2.

Once the workflow gets completed, the message is published to the respective topic in the event source 340. The status of the workflow instance 320-i is updated as completed and the workflow status is published on the event source 340 for storage. In this manner, in some embodiments, the status of the workflow instance 320-i can be monitored (e.g., at any point in time), using a monitoring agent, such as an event listener 350, that is subscribed to the topic. The event tracking of any work instance will be persisted in the event source store 340 and will be kept, for example, for a pre-configured time period.

Figure 4:
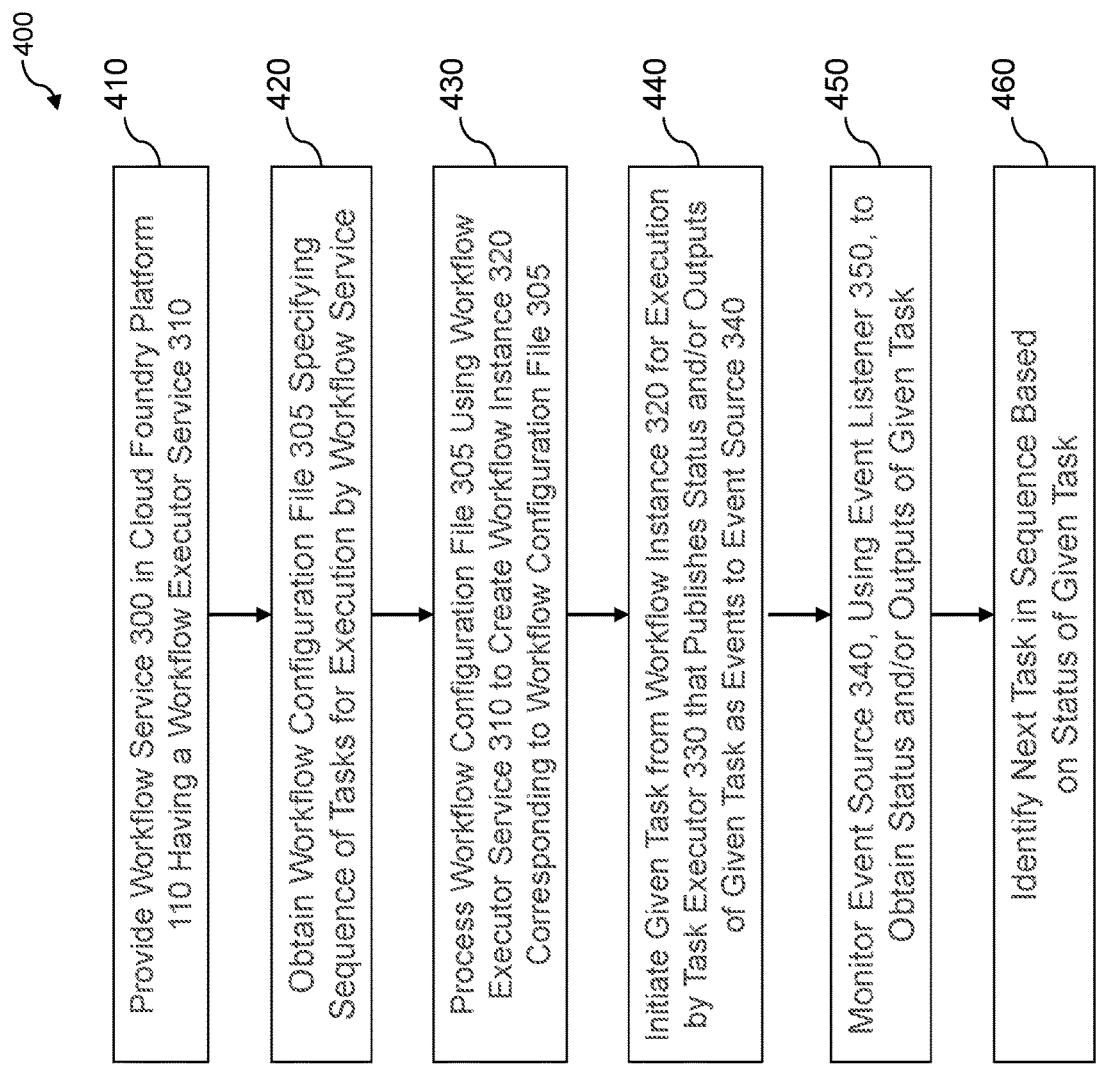
FIG. 4 is a flow chart illustrating an exemplary implementation of a workflow service process for a cloud foundry, according to at least one embodiment.

FIG. 4 is a flow chart illustrating an exemplary implementation of a workflow service process 400 for a cloud foundry, according to at least one embodiment. As shown in FIG. 4, the exemplary workflow service process 400 initially provides a workflow service 300 having a workflow executor service 310 in a cloud foundry platform 110 during step 410. Thereafter, a workflow configuration file 305 is obtained during step 420 specifying a sequence of tasks for execution by the workflow service 300. As noted above, in some embodiments, the workflow configuration file 305 is specified in a JSON format.

During step 430, the exemplary workflow service process 400 processes the workflow configuration file 305 using a workflow executor service 310 to create a workflow instance 320 corresponding to the workflow configuration file 305. Thereafter, a given task from the workflow instance 320 is initiated for execution by the task executor 330 that publishes the status and/or outputs of the given task as events to the event source 340 during step 440.

The exemplary workflow service process 400 monitors the event source 340, during step 450, using the event listener 350, to obtain the status and/or outputs of the given task. Finally, during step 460, the next task in the sequence is identified, based on the on status of the given task.

In some embodiments, steps 430, 440, 450 and 460 are performed in response to a new workflow configuration file 305 received during step 410.

In one or more embodiments, the disclosed techniques for providing a workflow service on a cloud foundry platform employ open source technologies that allow one or more system components to be configurable and/or vendor neutral.

One or more embodiments of the disclosure provide improved methods, apparatus and computer program products for providing a workflow service on a cloud foundry platform. The foregoing applications and associated embodiments should be considered as illustrative only, and numerous other embodiments can be configured using the techniques disclosed herein, in a wide variety of different applications.

It should also be understood that the disclosed workflow service techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for providing a workflow service on a cloud foundry may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based workflow service engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based workflow service platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
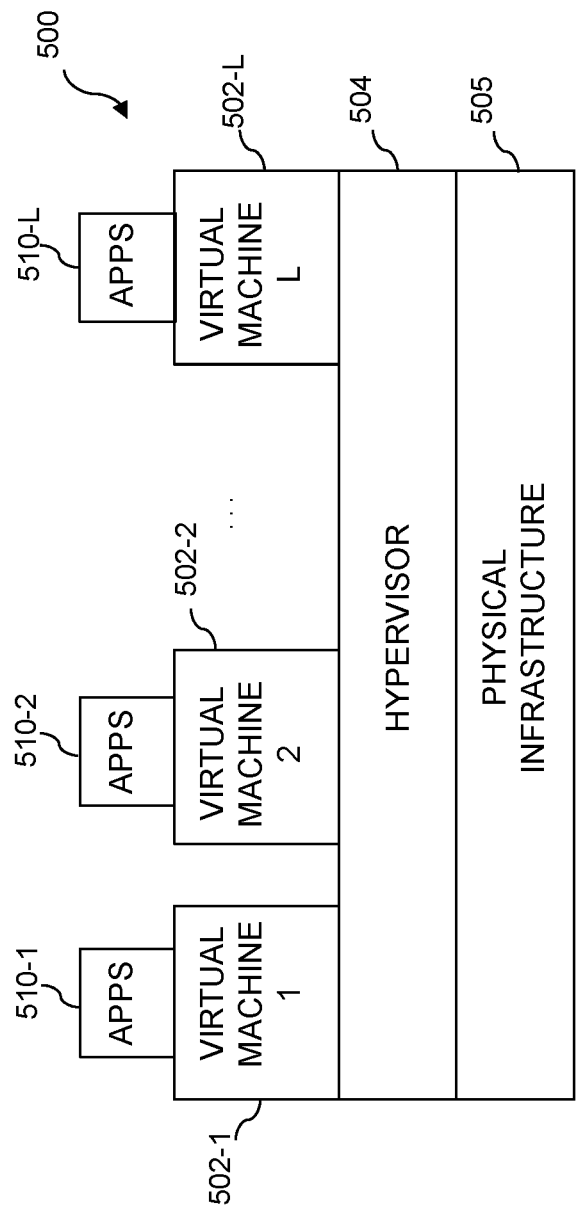
FIG. 5 illustrates an exemplary processing platform that may be used to implement at least a portion of one or more embodiments of the disclosure comprising a cloud infrastructure.

Referring now to FIG. 5, one possible processing platform that may be used to implement at least a portion of one or more embodiments of the disclosure comprises cloud infrastructure 500. The cloud infrastructure 500 in this exemplary processing platform comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

The cloud infrastructure 500 may encompass the entire given system or only portions of that given system, such as one or more of client, servers, controllers, or computing devices in the system.

Although only a single hypervisor 504 is shown in the embodiment of FIG. 5, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 504 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the cloud-based workflow service engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed cloud-based workflow service apparatus may each run on a computer, server, storage device or other processing platform element. A given such element may be viewed as an example of what is more generally referred to herein as a "processing device." The cloud infrastructure 500 shown in FIG. 5 may represent at least a portion of one processing platform.

Figure 6:
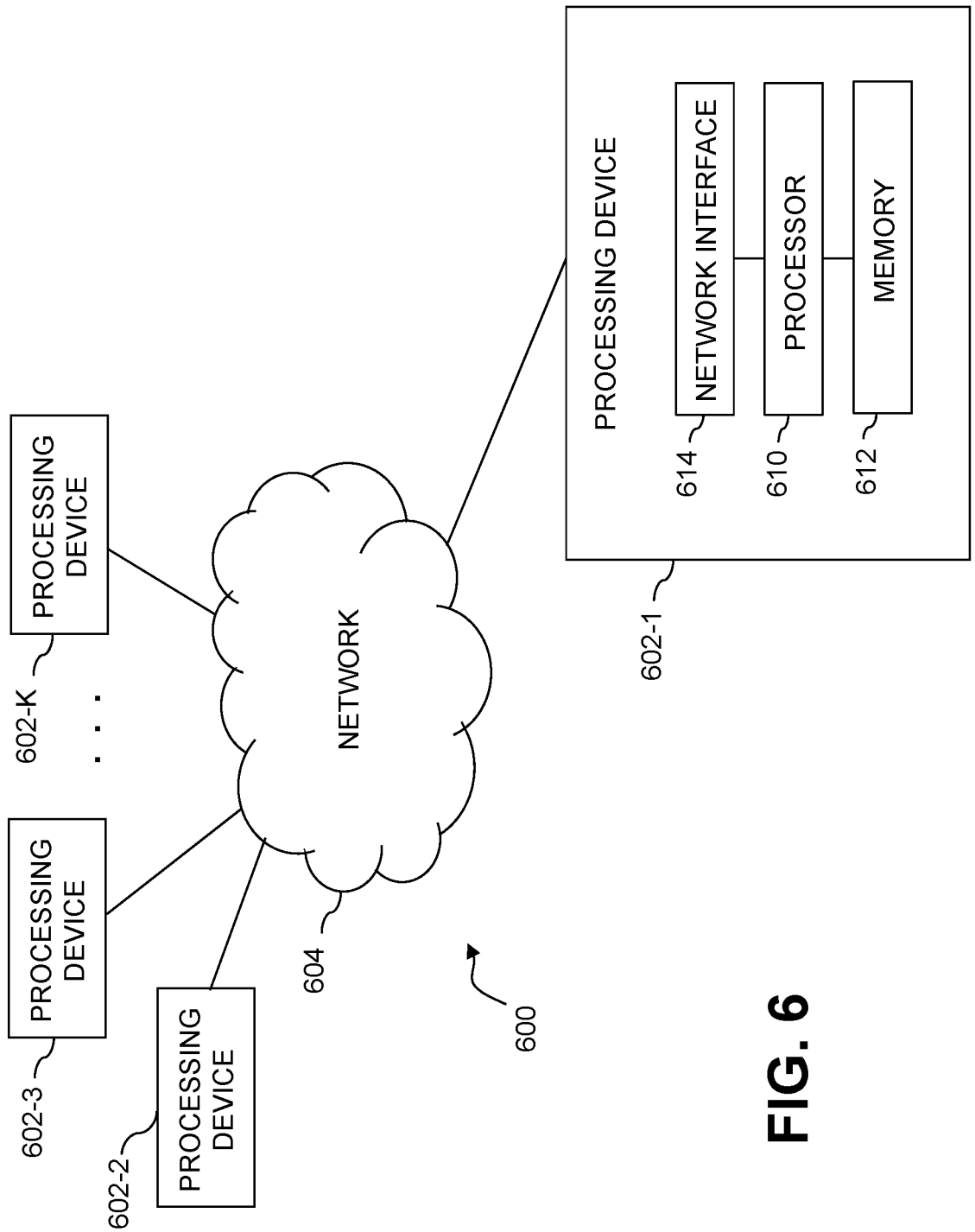
FIG. 6 illustrates another exemplary processing platform that may be used to implement at least a portion of one or more embodiments of the disclosure.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:
1. A method, comprising:
providing a workflow service in a cloud-based platform, wherein the workflow service (i) comprises a workflow executor service and (ii) is integrated in the cloud- based platform using an application programming interface for which a cloud controller of the cloud-based platform is a client;

obtaining, by the workflow service, a workflow configuration file specifying a sequence of tasks for execution by the workflow service;

processing, using at least one processing device, said workflow configuration file using the workflow executor service to create a new workflow instance corresponding to the workflow configuration file;

initiating, using the at least one processing device, a given task from the new workflow instance for execution by a task executor, wherein the task executor publishes a status and one or more outputs of the given task as one or more events to an event source, wherein the event source maintains events published by the task executor in an event store for a configured period of time;

in response to receiving a published message indicating a status change of the given task, obtaining, by a decider process executing on said at least one processing device and associated with said workflow service, the status and the one or more outputs of the given task by monitoring the event source using an event listener;

identifying, by the decider process, a next task in the sequence of tasks of the new workflow instance based on at least a portion of the one or more outputs and the status of the given task, wherein the decider process coordinates a plurality of concurrent tasks and task execution across multiple workflow instances created by the workflow executor service, wherein at least one of the multiple workflow instances interacts with the new workflow instance, and wherein said event source maintains the events published by the task executor in the event store without said new workflow instance and said decider process separately maintaining the status and the one or more outputs of the given task; and initiating an execution of the next task by the workflow.

2. The method of claim 1, wherein one or more of the workflow executor service, the task executor, the event source and the event listener are implemented using open source technology.

3. The method of claim 2, wherein the open source implementation of the one or more of the workflow executor service, the task executor, the event source and the event listener components is one or more of configurable and vendor neutral.

4. The method of claim 1, wherein the task executor and the event listener employ a same open source technology as the event source.

5. The method of claim 1, wherein the workflow configuration file specifies the sequence of tasks using a Java Simple Object Notation.

6. The method of claim 1, wherein the tasks are part of a customer flow.

7. The method of claim 1, wherein the processing, initiating, monitoring and identifying steps are performed in response to a new workflow configuration file.

8. The method of claim 1, wherein the cloud-based platform comprises a cloud foundry platform, and wherein the method further comprises:

creating a service broker that wraps the workflow service as a tile in the cloud-based platform.

9. The method of claim 1, further comprising:

publishing a completed status of the new workflow instance to the event source when the new workflow instance completes.

10. The method of claim 1, further comprising:

permitting interactions between two or more of the multiple workflow instances, when types of the two or more of the multiple workflow instances are configured in a same domain.

11. The method of claim 1, wherein said event store comprises an in-memory data structure store.

12. A system, comprising:

a memory; and at least one processing device, coupled to the memory, operative to implement the following steps:

providing a workflow service in a cloud-based platform, wherein the workflow service (i) comprises a workflow executor service and (ii) is integrated in the cloud-based platform using an application programming interface for which a cloud controller of the cloud-based platform is a client;

obtaining, by the workflow service, a workflow configuration file specifying a sequence of tasks for execution by the workflow service;

processing, using the at least one processing device, said workflow configuration file using the workflow executor service to create a new workflow instance corresponding to the workflow configuration file;

initiating, using the at least one processing device, a given task from the new workflow instance for execution by a task executor, wherein the task executor publishes a status and one or more outputs of the given task as one or more events to an event source, wherein the event source maintains events published by the task executor in an event store for a configured period of time;

in response to receiving a published message indicating a status change of the given task, obtaining, by a decider process executing on said at least one processing device and associated with said workflow service, the status and the one or more outputs of the given task by monitoring the event source using an event listener;

identifying, by the decider process, a next task in the sequence of tasks of the new workflow instance based on at least a portion of the one or more outputs and the status of the given task, wherein the decider process coordinates a plurality of concurrent tasks and task execution across multiple workflow instances created by the workflow executor service, wherein at least one of the multiple workflow instances interacts with the new workflow instance, and wherein said event source maintains the events published by the task executor in the event store without said new workflow instance and said decider process separately maintaining the status and the one or more outputs of the given task; and initiating an execution of the next task by the workflow.

13. The system of claim 12, wherein one or more of the workflow executor service, the task executor, the event source and the event listener are implemented using open source technology that allow the one or more of the workflow executor service, the task executor, the event source and the event listener components to be one or more of configurable and vendor neutral.

14. The system of claim 12, wherein the workflow configuration file specifies the sequence of tasks using a Java Simple Object Notation, and wherein the processing, initiating, monitoring and identifying steps are performed in response to a new workflow configuration file.

15. The system of claim 12, wherein the cloud-based platform comprises a cloud foundry platform, and wherein said steps comprise a step of creating a service broker that wraps the workflow service as a tile in the cloud-based platform.

16. The system of claim 12, wherein said steps comprises a step of publishing a completed status of the new workflow instance to the event source when the new workflow instance completes.

17. A computer program product, comprising a tangible machine-readable storage medium having encoded therein executable code of one or more software programs, wherein the one or more software programs when executed by at least one processing device perform the following steps:
  providing a workflow service in a cloud-based platform, wherein the workflow service (i) comprises a workflow executor service and (ii) is integrated in the cloud-based platform using an application programming interface for which a cloud controller of the cloud-based platform is a client;
  obtaining, by the workflow service, a workflow configuration file specifying a sequence of tasks for execution by the workflow service;
  processing, using the at least one processing device, said workflow configuration file using the workflow executor service to create a new workflow instance corresponding to the workflow configuration file;
  initiating, using the at least one processing device, a given task from the new workflow instance for execution by a task executor, wherein the task executor publishes a status and one or more outputs of the given task as one or more events to an event source, wherein the event source maintains events published by the task executor in an event store for a configured period of time;
  in response to receiving a published message indicating a status change of the given task, obtaining, by a decider process executing on said at least one processing device and associated with said workflow service, the status and the one or more outputs of the given task by monitoring the event source using an event listener;
  identifying, by the decider process, a next task in the sequence of tasks of the new workflow instance based on at least a portion of the one or more outputs and the status of the given task, wherein the decider process coordinates a plurality of concurrent tasks and task execution across multiple workflow instances created by the workflow executor service, wherein at least one of the multiple workflow instances interacts with the new workflow instance, and wherein said event source maintains the events published by the task executor in the event store without said new workflow instance and said decider process separately maintaining the status and the one or more outputs of the given task; and
  initiating an execution of the next task by the workflow.

18. The computer program product of claim 17, wherein one or more of the workflow executor service, the task executor, the event source and the event listener are implemented using open source technology that allow the one or more of the workflow executor service, the task executor, the event source and the event listener components to be one or more of configurable and vendor neutral.

19. The computer program product of claim 17, wherein the workflow configuration file specifies the sequence of tasks using a Java Simple Object Notation, and wherein the processing, initiating, monitoring and identifying steps are performed in response to a new workflow configuration file.

20. The computer program product of claim 17, wherein the cloud-based platform comprises a cloud foundry platform, and wherein said steps comprise a step of creating a service broker that wraps the workflow service as a tile in the cloud-based platform.

\* \* \* \* \*